May 22, 1956 F. L. KRADEL ET AL 2,747,142
AUTOMATIC LINE SECTIONALIZING AND SERVICE RESTORATION DEVICE
Filed March 13, 1952 4 Sheets-Sheet 3
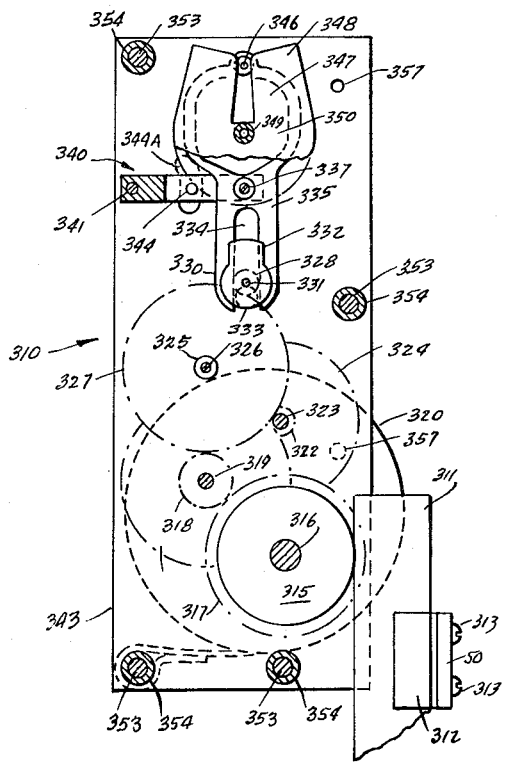
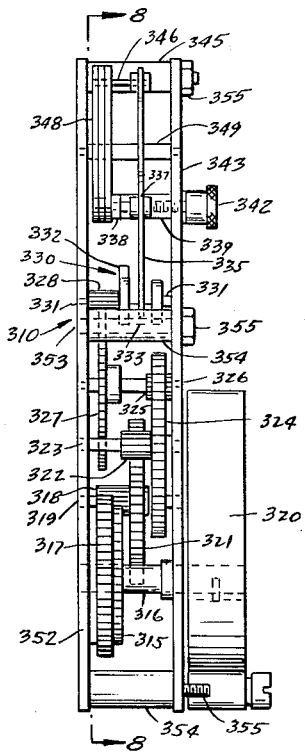
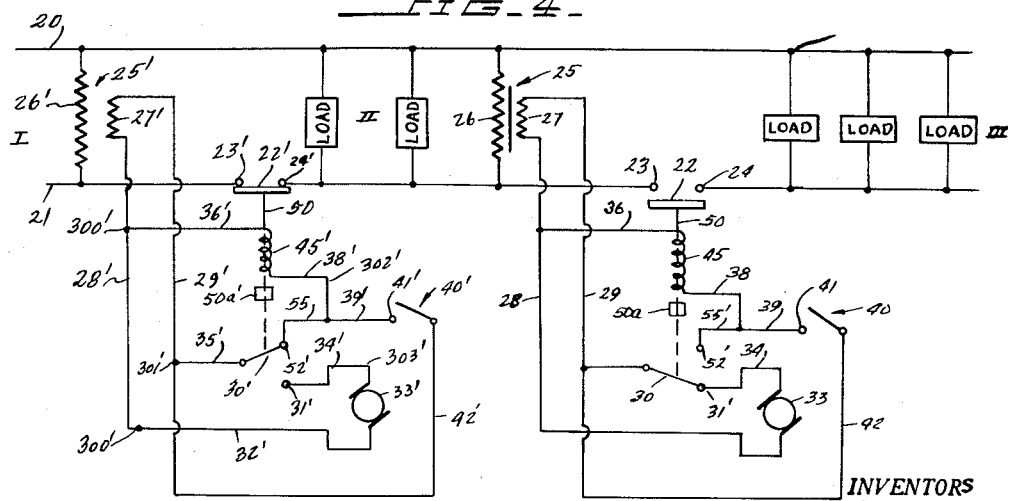
INVENTORS
FRED L. KRADEL & AREM FOTI
BY Samuel Ostrolenk
OSTROLENK & FABER May 22, 1956　　F. L. KRADEL ET AL　　2,747,142
AUTOMATIC LINE SECTIONALIZING AND SERVICE RESTORATION DEVICE
Filed March 13, 1952　　　　　　　　　　　　4 Sheets-Sheet 4
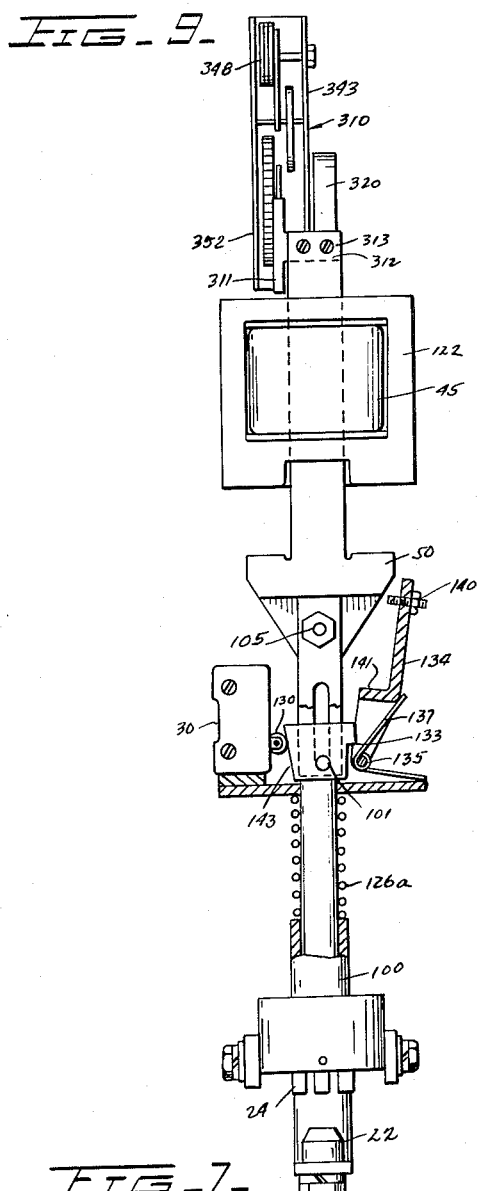
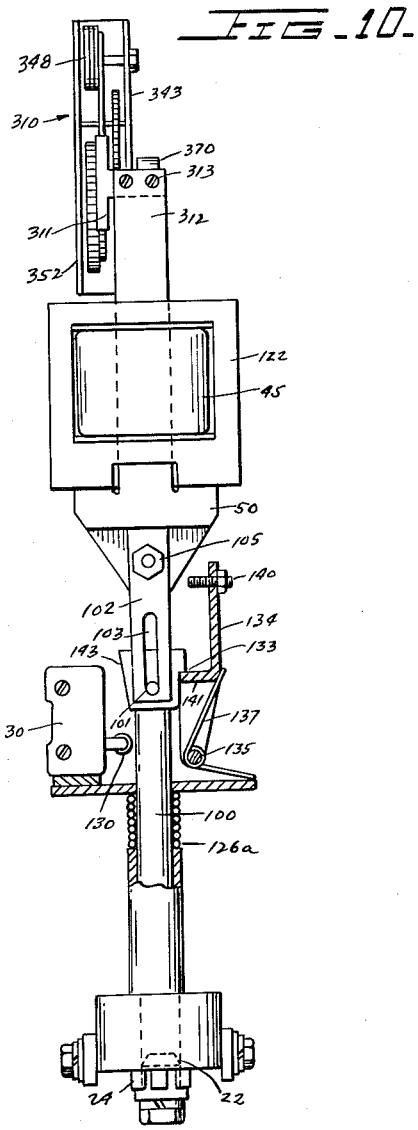
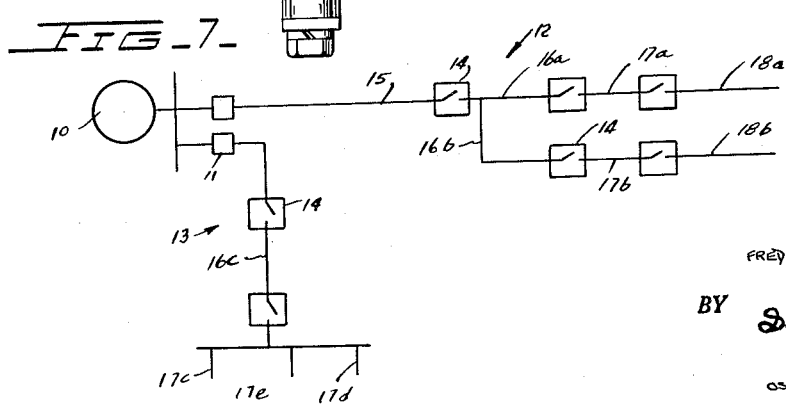
INVENTORS
FRED L. KRADEL & AREM FOTI
BY Daniel Ostrolenk
OSTROLENK & FABER United States Patent Office 2,747,142
Patented May 22, 1956

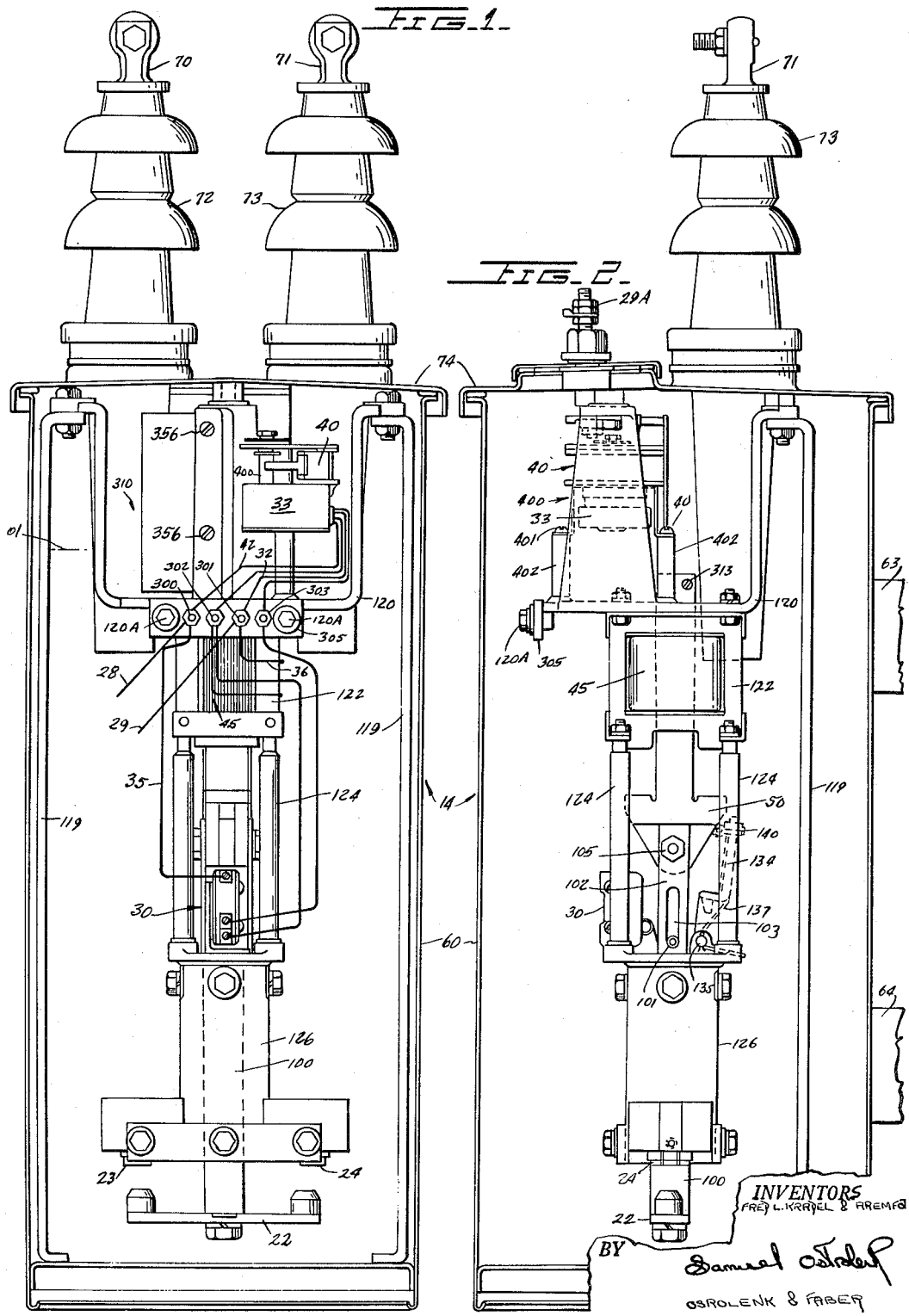

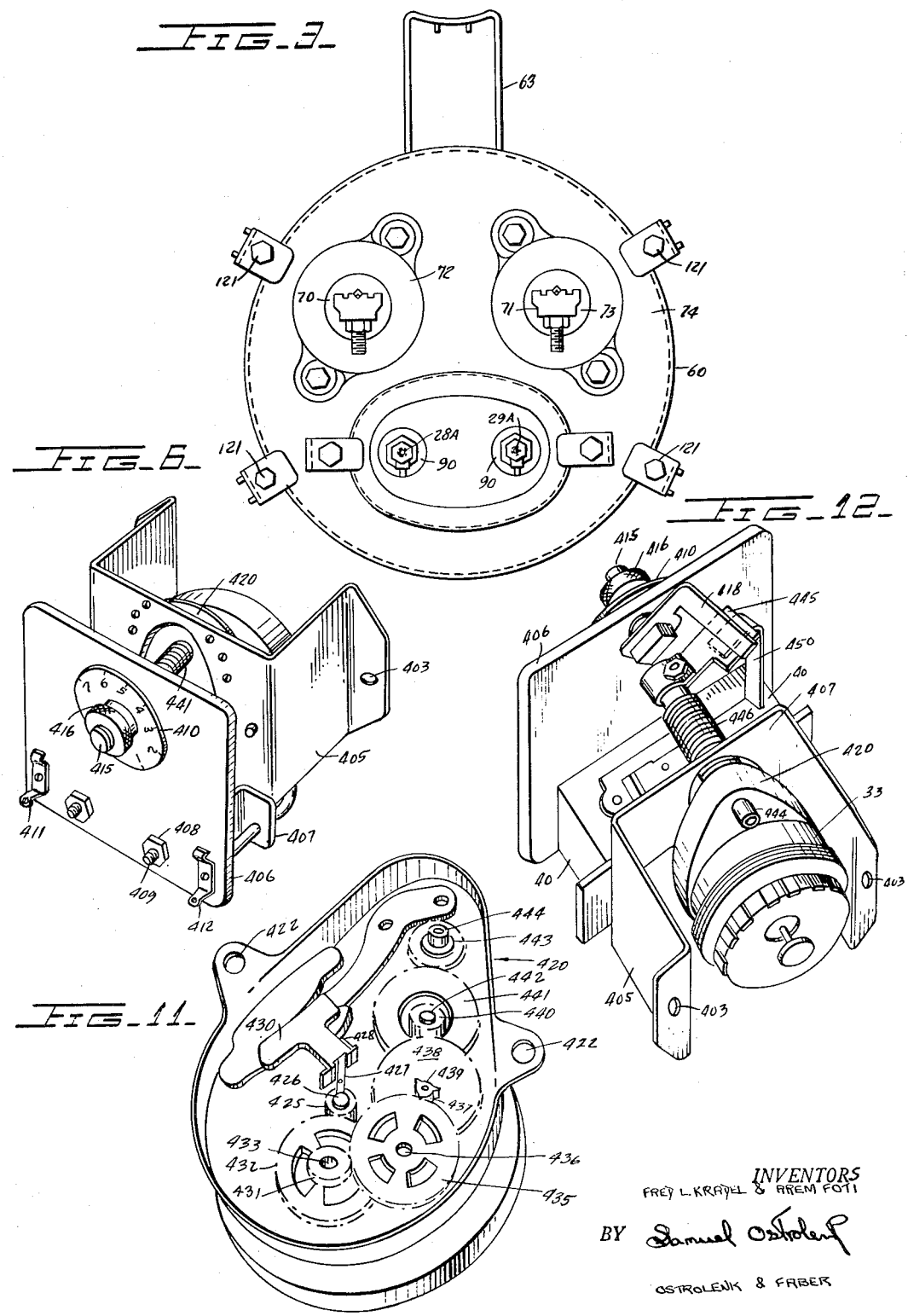

2,747,142
AUTOMATIC LINE SECTIONALIZING AND SERVICE RESTORATION DEVICE

Fred L. Kradel and Arem Foti, Greensburg, Pa., assignors to I-T-E Circuit Breaker Company, Philadelphia, Pa., a corporation of Pennsylvania Application March 13, 1952, Serial No. 276,418

1 Claim. (Cl. 317—22)

Our present invention relates to an automatic line sectionalizing and service restoration system and device therefor, and more particularly to a system and device of this character so arranged that in the event of a failure of service in the system, sections of the system may be progressively and sequentially energized in order to permit prompt restoration of the system.

In the operation of long line electric power systems where a multiplicity of loads of various kinds at different distances from the primary generator or set of generators exist, when a fault develops adjacent the generating station resulting in opening the circuit to the multiplicity of loads, it becomes a time consuming and difficult task once the cause of the fault has been obviated to restore service.

The reason for this is that usually a large part of the load remains in circuit on the dead line and when the generator is brought into service once more, the protective devices for the generator or the generator itself cannot handle the multiplicity of inrush current and starting loads which are simultaneously placed on it.

Consequently, in the event of a complete outage of relatively long duration, it becomes necessary to communicate in various ways with the users of the current to have them shut off or diconnect major portions of their respective loads so that the generator and especially the protective devices for the generator will be able to handle the starting loads or inrush currents owing to the fact that these have been greatly reduced.

As these starting loads or inrush currents are taken up, other loads may be connected into the system progressively until the system is in full operating order once more.

In the ordinary case, therefore, on the occurrence of such an outage, the removal of the cause of the outage and the reenergization of the system, attempts are first made to bring the system into operation. On failure of these attempts, men are sent out or telephone communications are made in order to ensure that the load is reduced to a point where the generator and its protective devices can handle the starting loads or inrush currents without danger to the generator and without opening of the protective devices for the generator.

Our automatic line sectionalizing and service restoration device embodies as its principal concept a device which is placed in the system in series with a section of distribution line and is adapted to open that section of the distribution line on the occurrence of an outage and to leave that circuit open until after the outage has been obviated and the voltage restored up to the particular section controlled by our device.

Our novel automatic line sectionalizing and service restoration device is so designed that it will open the circuit in which it is placed after a short time delay following a loss of voltage.

Thereafter on re-energization of the circuit from the source of supply, our novel automatic line sectionalizing and service restoration device is so connected that after a time delay it will close the circuit and energize the line beyond the automatic line sectionalizing and service restoration device.

Thus, assuming a plurality of distribution lines extend from the generator each having a plurality of sections, the automatic line sectionalizing and service restoration devices will be placed in a predetermined manner between the various sections in the various distribution lines.

Each of the automatic line and service restoration devices has a definite time delay for opening the contacts after an outage. The automatic line sectionalizing and service restoration devices which are furthest from the generator have the shortest time delay so that after an outage of some duration of time, the automatic line sectionalizing and service restoration devices sequentially open until the distribution line is disconnected into separate dissociated sections. The reason for having a different time delay on the various automatic sectionalizing and service restoration devices is due to the fact that the longer the outage the greater will be the inrush current from any section of line. Thus if the generator can supply a certain maximum demand, the longer the outage, the fewer the sections permissible not to exceed the maximum demand. Thus, as the length of the time of the outage increases, more portions of the line must be disconnected.

After a finite fixed interval of time, all the automatic line sectionalizing and service restoration devices are opened, and only one section of each line remains directly connected to the generator through its protective devices. This one section after an extended outage has an inrush current demand equal to or less than the maximum available supply. The maximum demand connected to the generator may not necessarily be a single series load but may be any combination parallel and series loads so that the sum thereof requires an inrush current not exceeding the maximum available supply.

Thereafter, upon the re-establishment of voltage from the source, the first section or sections which are connected through appropriate protective devices directly to the generator will immediately become energized and the automatic line sectionalizing and service restoration device between them and the next section or between the generator and other distribution lines will become energized to close their principal contacts after a short time delay. The automatic line sectionalizing and service restoration devices are placed between the various sections of the distribution lines so that at any time the inrush currents plus the currents due to the loads or any section lines already connected is equal to the maximum supply obtainable from the generator. Thus in a similar manner the loads are gradually and sequentially connected to the generator so that the inrush currents are never excessive.

Thus, our novel automatic line sectionalizing and service restoration device comprises a device responsive to the source of energy to open the circuit closing means between the source of energy and the next load.

The first automatic line sectionalizing and service restoration devices in the system receive their energy from the section of line connected to generator itself.

The second automatic line sectionalizing and service restoration devices in the system are in turn energized over a circuit established by the completion of the closing operation of the first automatic line sectionalizing the service restoration devices.

The third automatic line sectionalizing and service restoration devices in the system are in turn energized over a circuit established by the completion of the closing operations of the second automatic line sectionalizing and service restoration devices and so on.

By this means, therefore, on the occurrence of an outage and upon subsequent restoration of voltage on the first sections of line, the loads will be brought into the circuit sequentially by predetermined increments so that the system may be progressively re-established with allowance for the inrush currents and starting loads to which it is subjected.

The entire operation of restoration proceeds automatically. It is no longer necessary to communicate with the operators of the loads to have them disconnect all or portions of their loads to permit restoration of current, and the circuit is restored in the most rapid manner consistent with the proper operation of the system during the restoration process.

In order to carry out our invention, each automatic line sectionalizing and service restoration device is provided with a transformer connected across the line which provides current at a reduced voltage to a timing motor in the automatic line sectionalizing and service restoration device. Upon restoration of voltage from the source of energy, the timing motor begins to operate and after a predetermined time interval closes a contact to a solenoid. The solenoid armature pulls up a contact which closes a circuit between the source of energy and the load or between the first section and the second section of line as has been pointed out above.

For this purpose, two adjacent sections of line are connected in series through a contact which is preferably spring biased open. This contact is maintained closed by an armature and solenoid connected to the transformer placed across the line on the source side of the sectionalizing and service restoration device. Therefore, on failure of voltage, the contact opens. On re-establishment of voltage, the motor above-mentioned after a time delay closes the circuit to the solenoid and thereby closes the main contact which re-establishes the series connection between adjacent sections of line.

The utilization of the motor provides the time delay necessary to connect the sections sequentially in series as above pointed out. Other time delay means may be utilized for this purpose of course.

On the occurrence of an outage, various types of loads will reach a condition of maximum demand in different time periods which are well known from experience. Thus, in the summer months in a residential area, refrigerator motors may reach the stage of required operation over a rather definite period. In the case of a short time outage, only a few more than the normal number of refrigerators will reach the stage where their motors must operate. As the outage continues, more and more refrigerators will reach the stage where their motors will operate when the circuit is energized until after a calculated period of outage, all motors are ready for re-starting when energized. The opening time delay for my novel automatic line sectionalizing and service restoration device is adjusted as above pointed out so that as the outage continues with the demand load gradually building up each automatic line sectionalizing and service restoration device in sequence from the remotest parts of the system in toward the generator will successively open. This will thereby reduce the length of the system by successive reductions in the number of sections to maintain the demand load equal to or less than that supplyable by the generator.

Therefore, the armature carrying the principal contact is provided with a time delay which will delay the opening of the main contact of the automatic line sectionalizing and service restoration device following an outage for a predetermined period of time so that if the voltage is restored within that predetermined period of time, the contact will not have had an opportunity to open and re-energization of the holding or closing solenoid will continue to hold the contact in place in closed circuit position.

Thus, the primary object of my invention is the provision of a novel automatic line sectionalizing and service restoration device.

Another object of our invention is to arrange my novel automatic line sectionalizing and service restoration device so that it is provided with a main contact which may be placed in series between adjacent sections of line.

A further object of our invention is to arrange my novel automatic line sectionalizing and service restoration device so that the energy for closing the main contact in series between two adjacent sections of line will be supplied from the section of line closer to the source of energy.

Another object of our invention is to provide for a time delay in the automatic line sectionalizing and service restoration device to effect the closing of the main series contact between two sections of line after a predetermined time interval.

Another object of our invention is to provide an additional time delay in my novel automatic line sectionalizing and service restoration device so that the main contact in series between two adjacent sections of line will not open, in response to a loss of energy, in less than a predetermined time.

Another object of our invention is to provide relatively low voltage operating means for my novel automatic line sectionalizing and service restoration device taken from the section of line closer to the source of energy by means of a step-down transformer or other suitable energy transducing device so that the operating mechanism our novel automatic line sectionalizing and service restoration device may be made small and compact without requiring heavy insulation, heavy buses and expensive structures to operate our novel automatic line sectionalizing and service restoration device.

Another object of our invention is to provide an automatic line sectionalizing and service restoration system which sequentially restores portions of the load to the source after an extended outage.

Another object of our invention is the provision of an automatic line sectionalizing and service restoration system providing after any outage the automatic connection of a portion of the load approximately equal to the maximum demand.

The foregoing and many other objects of our invention will become apparent in the following description and drawings in which:

Figure 1 is a side view partly broken away of our novel automatic line sectionalizing and service restoration device.

Figure 2 is another side view of our novel automatic line sectionalizing and service restoration device, taken at 90° from the view of Figure 1.

Figure 3 is a top view of our novel automatic line sectionalizing and service restoration device.

Figure 4 is a diagram illustrating the operation and manner of connection of our novel automatic line sectionalizing and service restoration device.

Figure 5 is a side view of the opening time delay of our novel automatic line sectionalizing and service restoration device.

Figure 6 is a view in perspective of the closing time delay of our novel automatic line sectionalizing and service restoration device.

Figure 7 is a schematic diagram illustrating the operation of our novel automatic sectionalizing and service restoration system.

Figure 8 is a sectional view of the opening time delay of our novel automatic line sectionalizing and service restoration device through line 8–8 of Figure 5.

Figure 9 is a sectional view of a portion of the operating mechanism in the open position.

Figure 10 is a sectional view of a portion of the operating mechanism in the closed position.

Figure 11 is a perspective view of the gear box with the cover removed.

Figure 12 is a view in perspective of the closing time delay of our novel automatic line sectionalizing and service restoring device. This figure is a second perspective view of the device shown in Figure 6.

Referring first to Figure 7, the generator 10 protected by the protective devices 11 is connected to distribution lines 12 and 13. The distribution lines 12 and 13 each contain a plurality of automatic line and service restoration devices 14 interconnecting line sections 15, 16a through 18a, 16b through 18b, 16c, 17c, 17d and 17e. Each of the automatic line sectionalizing and service restoration devices 14 has a predetermined time delay for opening the circuit after a load outage. The automatic line sectionalizing and service restoration devices 14 which are furthest from the generator 10 have the shortest time delay so that after an outage the automatic line sectionalizing and service restoration devices 14 sequentially open until the entire distribution lines 12 and 13 are disconnected into separate dissociated sections. It is necessary to have the time delays of the automatic line sectionalizing and service restoration devices 14 so arranged to sequentially sectionalize the lines 12 and 13 in order to restrict the initial load and inrush current demand to a value which is not prohibitive for the generator 10 and its protective devices 11. The longer the load outage over any section of the lines 12 and 13 the greater will be the initial load and inrush current demand up to a certain maximum value, this maximum value being the inrush currents due to every load in the section starting up at once. Due to the diversity of load during any comparatively short outage, the inrush currents are generally less than this maximum value or demand.

Thus, if the generator 10 can only supply a maximum demand of a certain value, the longer the outage, the fewer sections of line which may be directly connected to the generator 10 when the load is reconnected so as not to exceed this maximum demand. As the length of time of the outage increases, more sections of the line must be disconnected and hence the automatic line sectionalizing and service restoration devices 14 sequentially open their contacts after a predetermined period of outage.

The automatic line sectionalizing and service restoration devices 14 between the sections 18a and 17a and 18b and 17b are adjusted, for example, to a time delay of 5 minutes so that after an interval of 5 minutes of outage they will disconnect the sections 18a and 18b from the sections 17a and 17b, respectively, and the remainder of the lines 12 and 13. If the cause of the outage is discovered and removed before the 5 minutes have elapsed, the protective devices 11 are closed and the inrush currents due to the complete loads on lines 12 and 13 are not in excess to the maximum demand permissible. If, however, the distribution factor is not as calculated and the inrush currents through the lines 12 and 13 are greater than the maximum demand permissible, the protective devices 11 will immediately reopen. The time delays in the automatic line sectionalizing and service restoration devices 14 will continue to operate undisturbed until a total of 5 minutes have elapsed, at which time the devices 14 between the sections 17a and 18a and 17b and 18b open. At this time, the normal inrush currents due to the load on the lines 12 and 13 without sections 18a and 18b are calculated to be equal to or less than the maximum permissible demand.

After an additional interval of time, for example, 5 minutes, or a total elapsed time of 10 minutes, the automatic line sectionalizing and service restoration devices 14 between the various sections 16a, 16b, 16c, and 17a through 17e are set to open. Thus after a total of 10 minutes of outage, when the protective devices 11 are closed, only sections 15, 16a, 16b and 16c are connected directly to the load. The estimated inrush currents from the sections 15, 16a, 16b and 16c are calculated to be equal to or less than the maximum permissible demand.

Suppose for the purposes of illustration the cause of outage after an elapsed time of 11 minutes is removed and the generator 10 is reconnected to the distribution lines 12 and 13, the sections 15, 16a, 16b and 16c remain directly connected to the generator 10 and their inrush currents do not exceed the maximum permissible value. The currents due to the loads in sections 15, 16a, 16b and 16c gradually reduce to their normal operating load value. After the time delay required to reach normal load, as is hereinafter described, the automatic line sectionalizing and service restoration devices 14 between the various sections 16a, 16b, and 16c, and 17a through 17e close. The generator must now produce current equal to the normal load current of the sections 15 and 16a, 16b and 16c plus the inrush currents of the sections 17a through 17e. The sections 17a through 17e are so sectionalized that this total value of current does not exceed the maximum permissible demand, thus in this manner the load is sequentially connected again to the generator 10.

Each combination of sections that is connected at any instant of time must then have a maximum inrush current less by the amount of load already connected than the maximum inrush current from the sections that are reconnected during the preceding interval of time.

The closing time delays of the automatic line sectionalizing and service restoration devices 14 may be completely staggered so that no two close at the same time after an outage. In the preferred modification the sections would be connected in this staggered manner so that the inrush currents are not cumulative at their peak values.

Referring now to Figure 4, the conductors 20 and 21 extend from the primary source of energy which may be the generator itself in which case the section at the left end of Figure 4 and to the left of main contact 22' may be section 15, in Figure 7, as described above.

As will be pointed out hereafter, this section may be a relatively remote section of the line, but for purposes of the automatic line sectionalizing and service restoration device shown at the left of Figure 4, conductors 20 and 21 constitute the high voltage source of energy.

Figure 4 is used for sake of simplicity. In actual service, the single phase case shown would usually have a sectionalizing device in both lines 20 and 21 unless line 20 was omitted and a ground return substituted therefor. In the case of a three phase line, a sectionalizing device usually would be placed in each of the three lines. This condition holds throughout and where one device is specified, it should be understood that two or three devices, depending on the number of lines, may be used.

Referring again to Figure 4, our novel automatic line sectionalizing and service restoration device is provided with the main contact 22' bridging stationary contacts 23' and 24' so that when the main contact 22' is opened, conductor 21 is broken and the first section is disconnected from the second section, which are hereinafter designated by the Roman numerals I and II, respectively.

A second automatic line sectionalizing and service restoration device is shown provided also with its main contact 22 cooperating with the stationary contacts 23 and 24 on opposite sides of the break in conductor 21 and thereby separating section II from a section III.

A relatively low voltage source of energy for our novel automatic line sectionalizing and service restoration device is provided in any suitable manner to be energized by the source of energy in section I, or in the section on the side of the contact 22' closer to the source. Such low voltage source of energy may comprise a transformer 25' having its primary 26' across the source of energy and having its secondary 27' connected to the low voltage conductors 28' and 29'.

The automatic line sectionalizing and service restoration device between sections I and II is shown closed connecting sections I and II and the automatic line sectionalizing and service restoration device between sections II and III is shown open so that section III does not receive energy from the high voltage source.

In Figure 4, we have shown a condition in which an outage or voltage failure has occurred. Section III, more remote from the generator than section II, has already been disconnected. Section II, however, at this instant, is still connected to section I. Before section II is disconnected voltage is restored to the transformer 25. The operations which occur in the automatic line sectionalizing and service restoration device between sections II and III will now be described.

When the high voltage source failed, solenoid 45′ was de-energized. The contact 22 is open and the double throw switch 30 has been moved so that it engages the contact 31.

Upon restoration of voltage a circuit is established from the secondary 27 of the transformer through conductor 28, wire 32, timing motor 33, wire 34, contact 31, switch arm 30, wire 35, conductor 29 and back to the primary 27.

On restoration of current in the high voltage source, the energization of transformer 25 provides low voltage energy in conductors 28 and 29 and the timer motor 33 begins to operate.

After a predetermined time delay to permit the inrush currents and starting loads to be taken up and adjusted to in the section closer to the source, as described above, the timing motor 33 closes the contact 40 on the stationary contact 41. This establishes a circuit to the solenoid 45 from the primary 27 to conductor 28, wire 36, solenoid 45, wire 38, wire 39, contact 41, switch contact 40, and wire 42 to conductor 29 and back to the secondary 27.

The energization of solenoid 45 results in movement of armature 50 to operate the contact 22 into closed circuit position against the stationary contacts 23 and 24, thereby connecting the section to the right of the automatic line sectionalizing and service restoration devices 14 which is more remote from the source, in series with the section to the left of the automatic line sectionalizing and service restoration device 14 which is closer to the source. The section to the right, or section of the automatic line sectionalizing and service restoration device 14, is thus energized.

This energization of the section III to the right of the automatic line sectionalizing and service restoration device 14 which is closed, now energizes the automatic line sectionalizing and service restoration device 14 beyond section III, so that the same operation may proceed subject to the time delay for purposes above described to re-established current in such sections.

On closing the main contact 22, contact arm 30 is moved from contact 31 to contact 52. The circuit to motor 33 is thus opened and a circuit for solenoid 45 which will maintain energy on solenoid 45 is established independent of the motor controlled circuit which thus remains a holding solenoid despite the opening of contact 40 by the motor 33.

The movement of switch arm 30 is mechanically performed by the actual closing movement of the contact 22 and the final holding circuit during operation for solenoid 45 is from the secondary 27 to conductor 28, wire 36, solenoid 45, wire 38, wire 55, contact 52, contact arm 30, wire 35 and conductor 29 back to the secondary 27.

The automatic line sectionalizing and service restoration device 14, therefore, remains closed during the time that the source of energy is on, utilizing only such energy as is necessary to maintain the solenoid 45 in operating condition so as to counteract the effect of the opening forces as is hereinafter described on main contact 22.

Since as described above a low voltage energy source is used for the operating parts of the automatic line sectionalizing and service restoration device 14 the contact arm 40 and contact arm 30 may be micro-switches; the motor 33 may be a very small low energy motor and the various conductors need only be small wires rather than heavier buses, thereby materially decreasing the cost of the unit.

In the event that voltage had not been restored, the armature 50′ between sections I and II will open its contacts 23′ and 24′ an interval of time after armature 50 opened its contacts 22, 23 and 24; it being understood that each of these armatures 50 and 50′ is provided with individual opening time delay devices 50A and 50A′ having individual time operating characteristics.

Correspondingly, upon reclosing, the automatic line sectionalizing and service restoration device 14 between sections I and II will close its contacts 22′, 23′ and 24′ before the automatic line sectionalizing and service restoration device between sections II and II will close it contacts. This is due to the fact that the motors 33 and 33′, etc. each have individual time delay characteristics for closing the switches 40 and 40′; the motor 33′ being closer to the load closes its switch 40′ before the more remote motor 33′ operates its switch 40.

In Figures 1, 2 and 3 we have shown a commercial physical embodiment of the automatic line sectionalizing and service restoration device illustrated schematically in Figures 4 and 7.

The automatic line sectionalizing and service restoration device is provided with a housing casing 60 which may be oil filled up to the level indicated by the oil line 61. The casing is provided with mounting lugs 63 and 64 to facilitate securement of my novel automatic line sectionalizing and service restoration device 14 on a pole or other structure adjacent to the high voltage conductors 20 and 21.

Where the source of energy to be used for the low voltage operating elements of my novel automatic line sectionalizing and service restoration device 14 is a transformer 25, then the transformer 25 may be mounted in the bottom of housing 60, the housing 60 being downwardly lengthened to permit this or may be mounted in a separate container attached to the housing 60 or it may be separately mounted.

Any other source of energy such as an auto-transformer or other device may also be similarly mounted or in very rare circumstances the source of energy may be provided by low voltage leads directly connected to a remote point in the section on the side of the automatic line sectionalizing and service restoration device 14 closer to the primary source of energy.

High voltage terminals 70 and 71 are provided mounted on insulators 72 and 73 on the top 74 of the housing 60 which are connected into the conductor 21. These high voltage terminals 70 and 71 are internally connected by appropriate buses, not shown, in the two stationary contacts 23 and 24 which may be bridged by the main movable contact 22.

In the device here shown the low voltage energizing source is mounted outside the casing and it is connected thereto through terminals 28A and 29A mounted in any appropriate insulator 90 on the top wall 74 of the casing 60.

The terminals 28A and 29A are connected to the connecting lugs 300 and 301 through the lines 28 and 29 shown schematically in Figure 4.

The lug 300 is connected to the switch contactor 30 through the line 35 and to the micro-switch 40 through the line 42. The lug 301 is connected to the coil 45 through the line 36 and to the motor 33 through the line 32.

There are altogether four lugs 300, 301, described above and 302 and 303. The lug 302 is connected to the other side of the coil 45, to the closed position of the micro-switch 30 and to micro-switch 40. The lug 303 is connected to the open position of the switch 30 and to the motor 33.

The electrical positioning of the four lugs 300 through 303 is also shown in Figure 4 where the lug connections are shown at 300′ through 303′.

The lugs 300 through 303 are mounted on an insulating base 305 which is rigidly attached to a bracket 120 by means of two hexagon head threaded bolts 120A.

The bracket 120 is mounted on three braces 119. Upon removal of the securement lugs 121 of the top wall, the casing 60 may be slipped down to expose the entire structure, the solenoid housing 122 being supported from bracket 120, the frame members 124 supporting the lower guide 126 for the contact rod 100 and supporting also the stationary contacts 23 and 24.

The main moving contact 22 is mounted at the lower end of the rod 100, the upper end of which is connected by pin 101 to link 102, the pin 101 riding in the slot 103 of link 102. Link 102 is connected by pin 105 to the armature 50 of solenoid 45.

The guide 126 may be provided with an internal compression spring 126A, shown in Figures 9 and 10, biasing the contact rod 100 downwardly and biasing the contact 22 to open circuit position or the biasing may be accomplished, as in the present modification, by means of gravity.

The operation of the operating mechanism is shown more specifically in Figures 9 and 10, wherein Figure 10 shows the closed position or the position of the various components when the solenoid 45 is energized and Figure 9 shows the open position where the solenoid 45 is de-energized. When the solenoid 45 is energized, it attracts upwardly the armature 50 carrying the pin 101 which in turn pulls up the rod 100. The rod 100 has attached to the bottom end thereof the movable contact 22 which thereby moves to the closed position against the contacts 23 and 24. When the contact 22 has moved up to the closed circuit position, a latch 133 carried at the top end of the rod 100 engages the hinged latching member 134. The latching member 134 is pivoted on a pin 135 and maintained in resilient contact by means of a spring 137 against the armature 50. The latching member 134 carries an adjusting screw 140 which makes the contact against the armature 50. In the closed position, the surface 141 of the latching member 134 essentially supports the rod 100 and thus the contact 22 in the closed position. When the armature 50 is allowed to move down, it slowly displaces the latching member 134 about its pivot 135 until the latch 133 falls off the latching surface 141. The weight then of the armature 50, the rod 100, loaded spring 126a, and the contact 22 causes the contact 22 to instantaneously open.

The rod 100 has also at its upper end a cam surface 143 which, as the rod 100 nears the end of its opening stroke, hits the roller 130 of the micro-switch 30 which, as described above, displaces the motor 33 of the closing time delay 400, hereinafter described, across the lines 28 and 29.

When the armature 50 leaves the closed position, it descends at a very slow rate determined by an opening time delay 310, hereinafter described. The loss of current from the source although resulting in a descent of the armature 50 does not immediately result in opening the contact 22 as the displacement taken by slot 103. Should current then be restored before the armature 50 completes its descent, where it causes the latching member 134 to release the rod 100, the armature 50 will be immediately drawn up into the solenoid 45 and the contact 22 will remain undisturbed in its closed position.

When the high voltage source is de-energized, the solenoid 45 is de-energized releasing the armature 50. The armature 50 slowly descends at a rate controlled by the mechanical time delay or opening delay 310 which is shown more specifically in Figures 5 and 8.

The armature 50 as shown in Figures 2, 9 and 10 protrudes above the coil 45 and carries, as shown in Figure 8, a geared bar 311. The armature 50 is attached to the protrusion 312 which is at right angles to the bar 311 and an integral unit thereof by means of two screws 313.

Referring now to Figures 5 and 8, the geared bar 311 meshes with the gear 315 which is mounted on a shaft 316. The shaft 316 also supports a gear 317 which meshes with the pinion 318 carried by the shaft 319.

The gear 315 is in strong frictional engagement with the gear 317 and rigidly attached to the shaft 316. When power is restored after an outage and the solenoid 45 is energized, the laminated armature 50 is drawn up into the solenoid 45 bearing the contact 22 to its latched close position, as described above, and moving the gear bar 311 with it. The thrust of the armature 50 and thus the bar 311 causes the driven gear 315 to slip in relation to gear 317. The gear 317 is the beginning of a chain of gears and pinion, as is hereinafter described, wherein each successive gear and pinion rotates through greater angles and where the sum of its frictional forces is great. The thrust of the armature 50 does not allow sufficient time or force for these comparatively large rotations and thus the gear 315 slips.

The rotation of the gear 315 and thus the shaft 316 due to the thrust of the bar 311 causes the tightening of the spiral spring 320 to which one end thereof is rigidly attached to the shaft 316.

Thus after the contact 22 is closed due to the return of power, the energized solenoid 45 maintains the bar 311 with the assistance of the various frictional effects in its raised position. The forces acting to lower the bar 311 and thus after a period of time open the contact 22 are the sum of the effect of spring 320, the weight of armature 50 and the spring 126a described above. As long as the solenoid 45 remains energized, the bar 311 remains locked in the closed or up position.

The gear 317 described above is frictionally mounted on the shaft 316 and engages the pinion 318 rigidly attached to the shaft 319. The shaft 319 also supports the gear 321 which engages a pinion 322. The pinion 322 is mounted on a shaft 323 which additionally supports the gear 324. The gear 324 engages a pinion 325 mounted on the shaft 326 which additionally supports the gear 327. The gear 327 engages a pinion 328 mounted together with a crank 330 between pins 331. The crank 330 has two arms 332 rotatably supporting therebetween a pin 333. The pin 333 engages the slot 334 of an oscillator arm 335 which is pivoted on a movable pin 337. The pin 337 is supported between the arms 338 and 339 of the adjusting bar 340 which is pivoted at one end thereof on a pin 341. The adjusting bar 340 is moved by means of the knurled screw 342 which bears against the plate 343 and threads into the hole 344 in the bar 340. Moving the screw 342 in the slot 344A carries with it the bar 340, the pin 333 and thus the oscillator arm 335. The oscillator arm 335 carries at its uppermost end a verge pin 346 which engages the slot 347 of the verge 348. The verge 348 is pivoted on the pin 349, which passes through the opening 350 of the oscillator arm 335. The various pins supporting the gears and pinions as described above are supported between the plates 343 and 352. The plates 343 and 352 are rigidly attached to each other by a plurality of screws 353, bushings 354 and nuts 355, and to the supporting structure 120 by means of two screws 356 shown in Figure 1 which thread the openings 357 in plate 343.

The opening time delay 310 is adjusted by means of the screw 342 which moves the verge pin 346 up and down in the slot 347 of the arm 335. When the solenoid 45 is de-energized, the combination of the weight of the armature 50 and the restoring forces of the springs 126a and 320 cause the geared bar 311 to move down towards its opening position. The speed at which the bar 311 descends or in other words, the time delay depends upon the frictional forces that must be overcome in the delay device 310 described above. Moving the pin 346 in the slot 347 increases or decreases its distance from the pivot 349 of the verge 348. In order for the gear train to move and thus allow the bar 311 to lower, the verge 348 must oscillate. The further from the pivot 349 is the driving or verge pin 346, the less torque required to oscillate the verge 348 and the smaller the angular distance traversed thereby, and hence the shorter the time delay. The opening time delay may in this manner be manually adjusted for any time from a few seconds to five minutes or even longer.

By this means the bar or rack 311 will descend slowly under the influence of the time delay 310 before the automatic line sectionalizing and service restoration device opens and rises instantaneously without a time delay to the restored position.

As described above when the high voltage source is energized, the motor 33 is energized, which after a predetermined time delay causes the closing of the contact 22.

The closing time delay 400 as shown in Figures 1 and 2 is attached to the bracket 120 by means of two screws 401 which pass through the bushings 402. The screws 401 as shown specifically in Figure 6 pass through the holes 403 in the flange 405.

Referring now to Figures 6, 11 and 12, two plates 406 and 407 sandwich the microswitch 40, described above, therebetween and are connected to the flange 405 by the nuts 408 and the screws 409. The plate 406 carries a graduated dial 410 and two connecting lugs 411 and 412, which are connected to the lugs 302 and 301 described above.

The dial 410 is mounted on a bolt 415 and moved by means of the nut or knurl 416. Rotating the nut 416 and thus the bolt 415 and the dial 410 causes the rotation or adjustment of a stop 418, shown more specifically in Figure 12, which varies the time delay as is hereinafter described.

Seated on the bottom of the flange 405 is the gear box 420 and the motor 33. The motor 33 is welded to the gear box 420 and so retained rigidly in position. The gear box 420 is attached to the flange 405 by means of screws not shown which pass through the openings 422 as shown in Figure 11.

The gear box 420 has a cover not shown which is welded in place to seal the unit against moisture and dust. Figure 11 shows the gear box 420 with the cover removed. The drive to the gear box 420 from the motor 33 is through an axially movable pinion 425. The pinion 425 is mounted on the rotor shaft 426 of the motor 33 and is supported by a pair of arms 427 which are pivoted on the pin 428. The pinion 425 and the arms 427 are counterbalanced by the magnetic member 430.

When power is returned to the line after an outage the shaft 426 of motor 33 immediately commences to revolve and at the same time the magnetic member 430 is pulled back against the casing 420 so that the pinion 425 meshes with the gear 431.

The gear 431 is mounted together with a pinion 432 on the shaft 433. The pinion 432 engages the gear 435 mounted on a pin 436. The gear 435 meshes with a pinion 437 mounted with the gear 438 on the shaft 439. The gear 438 meshes with the pinion 440 mounted with the gear 441 on the pin 442. The gear 441 meshes with the pinion 443 which is mounted on the shaft 444. The shaft 444 protrudes through the cover and supports the arm 445 and the coiled restoring spring 446.

During an outage the pinion 425 is not in mesh and the restoring spring 446 causes the shaft 444 bearing the arm 445 to return to the stop 418. When the power is returned the motor 33 through the gear box 420 with the pinion 425 in mesh causes the arm 445 to rotate until it engages the arm 450 of the microswitch 40 closing its contacts and entering the solenoid 45 into the circuit, closing the contacts 22, 23 and 24 as described above.

The time delay may be adjusted by moving the stop 418 so that the arm 445 will have a greater or lesser distance to traverse before it closes the switch 40.

By this means, therefore, we provide a novel simplified automatic line sectionalizing and service restoration device which obviates all of the difficulties previously encountered on the occurrence of an outage on long lines by providing automatically for sectionalizing of the line and sequential energization of the sections in series so that current may be restored automatically in the line in a step by step manner.

In the foregoing we have described my invention solely in connection with specific illustrative embodiments thereof. Since many variations and modifications of my invention will now be obvious to those skilled in the art, we prefer to be bound not by the specific disclosures herein contained but only by the appended claim.

We claim:

A sectionalizing and service restoration device comprising a switch; an electromagnet having an armature for operating said switch to opened and closed position; a time delay mechanism mechanically connected to said armature and operative upon de-energization of said electromagnet for controlling the time of operation of said switch to opened position; an energizing circuit for said electromagnet including a self-locking circuit; a connection from said armature for operating said self-locking circuit when said armature moves said switch to closed position; an electric motor; an open energizing circuit for said electric motor becoming closed by said armature upon de-energization of said electromagnet; a switch controlled by said electric motor which closes said second-mentioned switch a predetermined interval of time following the energization of said motor; and an open energizing circuit for said first-mentioned electromagnet being completed by said second-mentioned switch upon its closing.

References Cited in the file of this patent

UNITED STATES PATENTS 2,590,083    Atkinson et al. _____ Mar. 25, 1952